United States Patent
Sudhakar

(10) Patent No.: US 8,478,338 B2
(45) Date of Patent: Jul. 2, 2013

(54) METHOD FOR REMOTELY AND AUTOMATICALLY ERASING INFORMATION STORED IN SIM-CARD OF A MOBILE PHONE

(75) Inventor: Ashok Em Sudhakar, Las Vegas, NV (US)

(73) Assignee: Jayn International Pte Ltd., Singapore (SG)

( * ) Notice: Subject to any disclaimer, the term of this patent is extended or adjusted under 35 U.S.C. 154(b) by 112 days.

(21) Appl. No.: 13/053,817

(22) Filed: Mar. 22, 2011

(65) Prior Publication Data
US 2012/0202462 A1 Aug. 9, 2012

(30) Foreign Application Priority Data
Feb. 4, 2011 (IN) .............................. 334/CHE/2011

(51) Int. Cl.
*H04B 1/38* (2006.01)
(52) U.S. Cl.
USPC ........... 455/558; 455/410; 455/411; 455/418; 455/419
(58) Field of Classification Search
USPC .............. 455/410, 411, 414.1, 418, 419, 420, 455/558
See application file for complete search history.

(56) References Cited

U.S. PATENT DOCUMENTS

| | | | | |
|---|---|---|---|---|
| 6,662,023 | B1* | 12/2003 | Helle | 455/558 |
| 8,064,883 | B2* | 11/2011 | Liu | 455/411 |
| 2004/0025053 | A1* | 2/2004 | Hayward | 713/201 |
| 2004/0030761 | A1* | 2/2004 | Takeuchi et al. | 709/220 |
| 2009/0298468 | A1* | 12/2009 | Hsu | 455/411 |
| 2009/0312055 | A1* | 12/2009 | Liu | 455/558 |
| 2010/0009669 | A1* | 1/2010 | Pirhonen et al. | 455/419 |

* cited by examiner

*Primary Examiner* — Olumide T Ajibade Akonai
(74) *Attorney, Agent, or Firm* — Oliff & Berridge, PLC

(57) ABSTRACT

Embodiments of the present disclosure relate to a method and system for remotely and automatically erasing information stored in SIM card memory and mobile phone memory including memory card of a mobile phone 101. The method includes sending a voice message comprising predetermined authentication parameters to a server 102 by an owner when the mobile phone 101 of the owner is lost. The method further includes authenticating the owner by the server 102 upon comparing the predetermined authentication parameters with the stored authentication parameters and sending activation signal by the server 102 to an erase application if the owner is authenticated. This signal will activate the erase application stored in the mobile phone 101 SIM card. The erase application generates destroy signal upon activation of the erase application to erase the information stored in the SIM card of the mobile phone 101.

11 Claims, 2 Drawing Sheets

METHOD FOR REMOTELY AND AUTOMATICALLY ERASING INFORMATION STORED IN SIM-CARD OF A MOBILE PHONE

TECHNICAL FIELD

Embodiments of the present disclosure relate to mobile applications. More particularly, embodiments relate to remotely and automatically erasing the information stored in the mobile phone memory and SIM card memory.

BACKGROUND

Nowadays the mobile phone owners are using the mobile phones not only for communication purpose but also to store the important data such as bank account details, pin numbers, passwords, important contacts, business information, financial information and other sensitive information.

The number of mobile phone subscriptions worldwide has reached 4.6 billion and is expected to increase to five billion by the end of 2010, according to U.N. telecommunications agency. The number of mobile phone subscribers in India alone totaled 612.2 million at the end of April 2010, up 100 million in the last five months, according to the Telecom Regulatory Authority of India. The result of the study reveals a large number of expected subscriptions, as there are currently more than 100 million such phone contracts currently closed. Still, nearly 3 million phone users add to this number every month, which explains the high expectations that are to be reached by this market in the next 5 years.

Very frequently the mobile phone owners lose their mobile phones without knowingly. Further, high price attached with the mobile phones attracts thieves to steal the mobile phones. Also, the important information sitting in the mobile phone motivates the fraudulent users to steal the mobile phones. If sensitive information falls into the wrong hands can lead to loss of business, property, or reputation or lead to civil and criminal liability. Thus, it becomes very important to secure the information stored in the mobile phone.

None of the existing technologies provides a solution to erase the data stored in the mobile phone remotely when the mobile phone owner loses their mobile phone to secure the information by not allowing accessing the data stored in the mobile device or beforehand erasing the information before the fraudulent user could see the information.

In light of the foregoing discussion, there is a need for a method and device to solve the above mentioned problems.

SUMMARY

The shortcomings of the prior art are overcome and additional advantages are provided through the provision of a method and a system as described in the description.

The present disclosure solves the limitations of existing arts by providing a methodology to erase the information, preferably mobile phone owner related information by accessing the mobile phones remotely.

In one embodiment, the technology disclosed in the present disclosure provides security to the information stored in the mobile phones by limiting the access to fraudulent user to such information.

In one embodiment, the technology disclosed in the present disclosure is capable of deleting or erasing the information from SIM card memory of the mobile phone.

In one embodiment, the technology disclosed in the present disclosure is capable of deleting or erasing the information from Mobile phone memory including memory card sitting in the mobile phone.

In one embodiment, mobile application required for erasing the information is downloaded from the remote server 102 and is activated automatically when the mobile phone owner register for lost of the mobile phones.

Additional features and advantages are realized through various techniques provided in the present disclosure. Other embodiments and aspects of the disclosure are described in detail herein and are considered as part of the claimed disclosure.

In one embodiment, the present disclosure provides a method for remotely and automatically erasing information stored in SIM card of a mobile phone 101, said method comprising acts of sending a voice message comprising predetermined authentication parameters to a server 102 by a owner when the mobile phone 101 of the owner is lost; authenticating the owner by the server 102 upon comparing the predetermined authentication parameters with the stored authentication parameters; sending activation signal by the server 102 to an erase application stored in the mobile phone 101 SIM card to activate the erase application when the owner is authenticated; and generating destroy signal by the erase application upon activation of the erase application to erase the information stored in the SIM card of the mobile phone 101.

In one embodiment, the erase application is downloaded onto the mobile phone 101 SIM card from the server 102 upon owner registration confirmation with the server 102.

In one embodiment, the predetermined authentication parameter is transmitted to the owner by the server 102 upon owner registration.

In one embodiment, the predetermined authentication parameter is selected from a group comprising user name, password and combinations thereof.

In one embodiment, the server 102 optionally sends the erase request along with the predetermined authentication parameter to the erase application to authenticate the owner by the erase application.

In one embodiment, the erase application optionally authenticates the owner by comparing the received predetermined authentication parameter with stored authentication parameter.

In one embodiment, the erase application automatically activated whenever the mobile phone 101 is switched ON and said activated erase application always checks for the erase request from the server 102 to erase the information stored in the SIM card.

In one embodiment, the erase application waits for predetermined amount of time, preferably in the range of 1 sec to 5 sec, before getting deactivated when the erase request from the server 102 is not initiated.

In one embodiment, the destroy signal is selected from a group comprising short circuit signal, reset signal and malware.

In one embodiment, the owner sends the voice message using a communication device 103 selected from a group comprising mobile phone 101, telephone, computer and any other device capable of sending voice messages.

In one embodiment, the present disclosure also provides a system for remotely and automatically erasing information stored in SIM card of a mobile phone 101, said system comprising a mobile phone 101 with SIM card is configured to download erase application from a server 102; the server 102 configured to receive erase request through voice message from the owner and to transmit activation signal to the erase application; said server 102 authenticates the owner before transmitting the activation signal; and a communication device 103 capable of sending erase request through the voice message to the server 102; wherein said erase application generates the destroy signal upon receipt of activation signal from the server 102 to erase the information stored in SIM card of the mobile phone 101.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The embodiments of the disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings wherein like reference numerals represent like elements and in which:

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present disclosure relate to erasing the information stored in the mobile phone 101 SIM card memory, mobile phone memory including memory card sitting in the mobile phone when the owner of the mobile phone 101 loses his mobile phone 101. This would ensure security of the information sitting on the mobile phone 101 SIM card and mobile phone memory as well.

Figure 1:
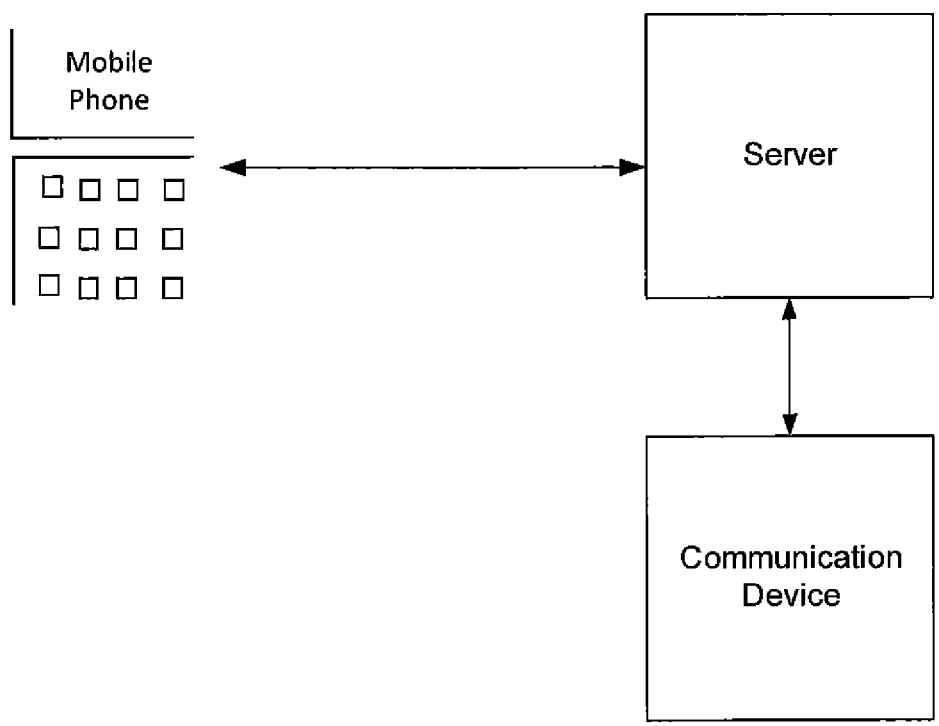
FIG. 1 is an exemplary block diagram of a system for remotely and automatically erasing the information stored on the mobile phone, in accordance with one embodiment.

FIG. 1 is an exemplary block diagram of the system for erasing the information stored in the mobile phone 101 SIM card memory. The system includes but is not limiting to the Mobile Phone 101, Server 102 and communication device 103. Henceforth, mobile phone 101 SIM card memory and Mobile phone 101 memory are alternatively used throughout the description and both them refer to mobile phone SIM card memory. The server 102 henceforth alternatively referred as application server 102 and both of them refer to the server. In order to secure the information stored in the mobile phone 101 SIM card memory when the owner loses his mobile phone 101 or when fraudulent user steals the owner's mobile phone 101, the owner has to register with the server 102.

During registration process, the server 102 request for plurality of information from the owner of the mobile phone. The information required for registering includes but are not limiting to user name, mobile number, IMEI number, Mobile number, SIM card number, voice of the mobile phone owner and any other information required for the registration. After completing the registration process, the owner downloads the erase application onto the mobile phone 101 SIM card memory. The server 102 generates unique user name and password for the downloaded application and forwards it to the owner for his records. The generated user name and password are used by the mobile phone 101 owner to authenticate the mobile phone 101 and to activate the erase application whenever the owner wants to erase the SIM card memory contents. As an example, the owner may choose to erase the SIM card memory contents when his mobile phone 101 is lost.

In one embodiment, the mobile phone owner loses his mobile phone 101. In another embodiment the fraudulent user steals the mobile phone 101 from the owner. In both the cases the owner has to secure his information which is sitting in the mobile phone 101 SIM card memory. In order to do that the owner sends voice message to the mobile number associated with the lost mobile phone 101. The voice message includes the user name and password provided to him during the registration process. This voice message is routed to the application server 102. Here, the owner can send the voice message using any other communication device 103 which has the facility of creating voice message. The communication device 103 includes but is not limiting to mobile phone, telephone, and computers.

In one embodiment, the owner can dial a toll free number associated with the server 102 to provide required information to activate the erase application. The required information can be provided as voice message. However, any other communication mode can be used to supply the necessary information to the server 102. The information includes but are not limiting to user name, password and mobile number.

In one embodiment, when the voice message is transmitted to the server 102, it verifies the voice of the owner for authenticating the owner. Once the voice authentication is done, the server 102 records the voice message. However, the voice authentication feature could be made optional. In the next step, the server 102 verifies the user name and password associated with the erase application downloaded on the owner's mobile phone 101. If the verification is successful then it sends activation signal to activate the erase application. If the mobile phone 101 is not switched OFF, the erase application immediately activated upon receipt the activation signal from the server 102. When the mobile phone 101 is switched OFF or SIM card of the Mobile phone 101 is loaded into different mobile phone 101, the server 102 waits till the mobile phone 101 is switched ON. As soon as the mobile phone 101 having the SIM card is switched ON, the erase application in the mobile phone 101 checks for the incoming erase signal from the server 102. If the application finds any such signal it automatically get activated. Once the erase application is activated, it generates destroy signal to erase the information stored in the SIM card memory. The destroy signal includes but is not limiting to short circuit signal, reset signal and malware.

In an alternative embodiment, the erase application downloaded from the server 102 includes unique user name and password. When owner loses his mobile phone 101, he dials his number and provides the user name and password associated with the erase application. When server 102 receives the erase request from the owner, it sends the user name and password associated with the erase application. When the mobile phone 101 having lost SIM card is switched ON, the erase application sitting in the SIM card memory is automatically activated. Now, the erase application receives the user name and the password from the server 102 and compares it with the stored user name and the password. If the comparison is successful, the application erases the information stored in the SIM card memory.

In one embodiment, the erase application downloaded in the mobile phone 101 SIM card memory always checks for the erase request from the server 102 upon activation. If the erase application receives such request, then it will erase the information. If the application fails to receive the erase request then the application will be deactivated after predetermined time period. For example the time period may range from 1 second to 5 seconds.

Figure 2:
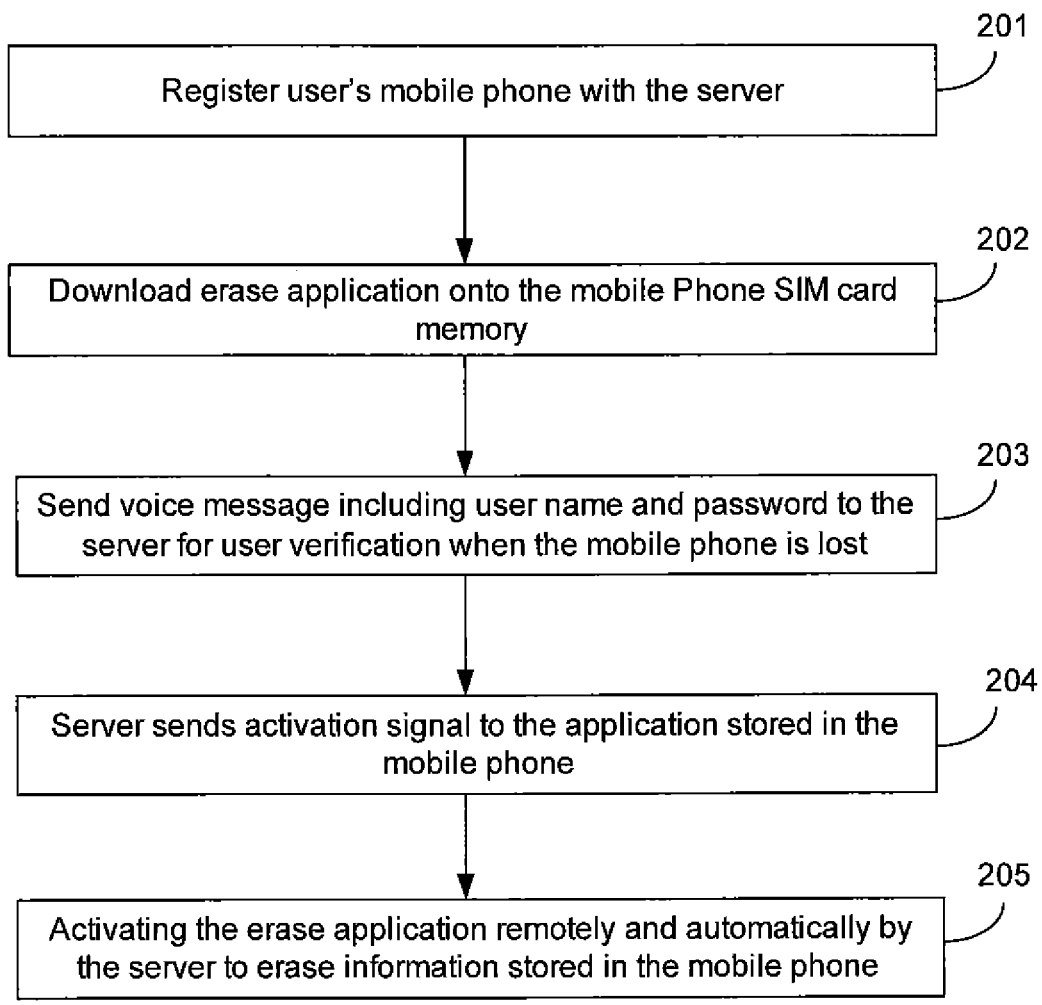
FIG. 2 is a flowchart illustrating a method for remotely and automatically erasing the information stored on the mobile phone, in accordance with one embodiment.

FIG. 2 is a flowchart illustrating a method for remotely and automatically erasing the information stored on the mobile phone 101, in accordance with one embodiment. The instant method erases the mobile information, in particularly owner related information from the Mobile phone 101 SIM card memory without giving any clue to the mobile phone 101 holder. The method also performs the verification of the registered owner to know whether the request for erasing the information is placed by the registered owner or not. This would give first layer of security. Further, the method requests for the unique user name and password associated with erase application stored on the mobile phone 101 SIM card memory to activate the erase application. This would ensure additional layer of security. The step by step process used in erasing the information remotely and automatically is discussed herein below in detail.

At step 201, the owner who wants to access the facility of Erase Application has to register his mobile phone 101 with the service provider. The service provider requests the predetermined information for completing the registration process. Once, the required information is supplied by the owner, his mobile phone 101 is registered with the service provider. The service provider generates unique user name and password for the erase application to be downloaded on the registered mobile phone 101 and transmit them to the user through predetermined communication channel. This user name and password is required to download the application and to activate the application. The information required for registering includes but are not limiting to user name, mobile number, IMEI number, Mobile number, SIM card number, voice of the owner and any other information required for the registration.

At step 202, after registration process the owner has to download the erase application onto his mobile phone 101 SIM card memory. Alternatively, the server 102 of the service provider pushes the erase application onto the mobile phone 101 of the owner. In one embodiment the owner may require to provide the use name and password provided to the service provider to download the application. The user name and password includes but are not limiting to numeric numbers, alphanumeric, alphabets, and symbols.

At step 203, the owner loses his mobile without his knowledge or may be the mobile phone 101 has been stolen by fraudulent user. In that case the owner has to send his request to erase the information stored in the SIM card memory of the mobile phone 101. In order to do this the owner contacts the server 102 of service provider by sending voice message. Alternatively, the owner can dial the toll free number provided to him during the registration process and provides his mobile number, the user name and the password. The voice message includes but is not limiting to the mobile number, the user name and the password. Once, the server 102 receives the request through voice message or by dial-in, compares the mobile number, the user name and the password included in the voice message with the stored mobile number, the user name and the password. In addition to this, the server 102 may also performs voice authentication of the owner to verify the owner. If the credentials provided by the owner matches with the stored parameters then the server 102 takes necessary action.

At step 204, the server 102 sends activation signal to the application stored in the SIM card memory after verification of the owner details. Upon receipt of the activation signal, the erase application generates destroy signal to erase the information stored in the SIM card memory. In one embodiment, the server 102 may only perform voice authentication and sends the activation signal along with the user name and password required to activate the erase application. The erase application after receiving the activation signal compares the received user name and the password with the stored user name and the password within the erase application. If the received credential matches with the stored parameters then the erase application is activated at step 205. The activated application generates destroy signal to erase the information stored in the SIM card memory of the mobile phone 101 in which it is used. The destroy signal which is generated by the erase application includes but is not limiting to short circuit signal, reset signal and malware to erase the information.

In an alternative embodiment, the registered user downloads the erase application into the SIM card memory and a copy of the application sits into the mobile phone memory as well. This copy of the application is utilized to erase the information sitting in the mobile phone memory. The mobile phone memory includes memory card. The information sitting in the mobile phone memory and memory card are automatically erased whenever user loses his mobile phones. The application downloaded into the phone memory is activated regardless of whether a new SIM card inserted or not.

The phones these days and future development will have larger memory in the phone and less on SIM card and will be independent of the SIM card. If the SIM card is taken out by the fraudulent user without preset protected safeguard (similar to unsetting an alarm in a house before going out, contrast with an intruder coming in uninvited) either reset short circuit or malware will erase the information on the phone itself. If the rightful owner wants to take the SIM card out for whatever reason, after all it is phone, then he/she will have to deactivate the application by providing necessary login information including but are not limiting to user name and password. Alternatively, the user can deactivate the application through voice authentication, retina scan, and fingerprint detection.

Once the application is deactivated, the owner can take out the card. The fraudulent user will not have access to the rightful owner's password and therefore will trigger the protective features of the application to erase the moment they pull the SIM card out.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and devices within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for remotely and automatically erasing information stored in SIM card of a mobile phone, said method comprising acts of:
    sending a voice message comprising predetermined authentication parameters to a server by a owner when the mobile phone of the owner is lost;
    authenticating the owner by the server upon comparing the predetermined authentication parameters with the stored authentication parameters;
    sending activation signal by the server to an erase application stored in the mobile phone SIM card to activate the erase application when the owner is authenticated; and
    generating destroy signal by the erase application upon activation of the erase application to erase the information stored in the SIM card of the mobile phone.

2. The method as claimed in claim 1, wherein the erase application is downloaded onto the mobile phone SIM card from the server upon owner registration confirmation with the server.

3. The method as claimed in claim 1, wherein the predetermined authentication parameter is transmitted to the owner by the server upon owner registration.

4. The method as claimed in claim 1, wherein the predetermined authentication parameter is selected from a group comprising user name, password and combinations thereof.

5. The method as claimed in claim 1, wherein the server optionally sends the erase request along with the predetermined authentication parameter to the erase application to authenticate the owner by the erase application.

6. The method as claimed in claim 5, wherein the erase application optionally authenticate the owner by comparing the received predetermined authentication parameter with stored authentication parameter.

7. The method as claimed in claim 5, wherein the erase application automatically activated whenever the mobile phone is switched ON and said activated erase application always checks for the erase request from the server to erase the information stored in the SIM card.

8. The method as claimed in claim 7, wherein the erase application waits for predetermined amount of time, preferably in the range of 1 sec to 5 sec, before getting deactivated when the erase request from the server is not initiated.

9. The method as claimed in claim 1, wherein the destroy signal is selected from a group comprising short circuit signal, reset signal and malware.

10. The method as claimed in claim 1, wherein the owner sends the voice message using a communication device selected from a group comprising mobile phone, telephone, computer and any other device capable of sending voice messages.

11. A system for remotely and automatically erasing information stored in SIM card of a mobile phone, said system comprising
    a mobile phone with SIM card is configured to download erase application from a server;
    the server configured to receive erase request through voice message from the owner and to transmit activation signal to the erase application; said server authenticates the owner before transmitting the activation signal; and
    a communication device capable of sending erase request through the voice message to the server; wherein said erase application generates the destroy signal upon receipt of activation signal from the server to erase the information stored in SIM card of the mobile phone.

* * * * *